(12) United States Patent
Brunner et al.

(10) Patent No.: US 10,877,353 B2
(45) Date of Patent: Dec. 29, 2020

(54) CONTINUOUS AUTOFOCUS MECHANISMS FOR IMAGE CAPTURING DEVICES

(71) Applicant: Apple Inc., Cupertino, CA (US)

(72) Inventors: Ralph Brunner, Cupertino, CA (US); David Hayward, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 606 days.

(21) Appl. No.: 15/663,569

(22) Filed: Jul. 28, 2017

(65) Prior Publication Data

US 2018/0059511 A1  Mar. 1, 2018

Related U.S. Application Data

(63) Continuation of application No. 14/313,621, filed on Jun. 24, 2014, now Pat. No. 9,720,302, which is a
(Continued)

(51) Int. Cl.
| | | |
|---|---|---|
| *G03B 13/36* | (2006.01) | |
| *H04N 5/232* | (2006.01) | |
| *H04N 5/77* | (2006.01) | |

(52) U.S. Cl.
CPC ......... *G03B 13/36* (2013.01); *H04N 5/23212* (2013.01); *H04N 5/23248* (2013.01);
(Continued)

(58) Field of Classification Search
CPC .... G03B 13/33; G03B 13/36; G03B 2213/00; H04N 5/232121; H04N 5/232122;
(Continued)

(56) References Cited

U.S. PATENT DOCUMENTS

| | | |
|---|---|---|
| 5,671,288 A | 9/1997 | Wilhelm et al. |
| 6,753,919 B1 | 6/2004 | Daugman |
| | (Continued) | |

FOREIGN PATENT DOCUMENTS

| | | |
|---|---|---|
| EP | 1983740 A1 | 10/2008 |
| JP | 2000-299813 | 10/2000 |

OTHER PUBLICATIONS

"Anti-Shake Technologies and Optical Image Stabilization," HP Photosmart Digital Cameras, © Copyright 2005 Hewlett-Packard Development Company, (3 pages).
(Continued)

*Primary Examiner* — Alicia M Harrington
(74) *Attorney, Agent, or Firm* — Womble Bond Dickinson (US) LLP

(57) ABSTRACT

At least certain embodiments described herein provide a continuous autofocus mechanism for an image capturing device. The continuous autofocus mechanism can perform an autofocus scan for a lens of the image capturing device and obtain focus scores associated with the autofocus scan. The continuous autofocus mechanism can determine an acceptable band of focus scores based on the obtained focus scores. Next, the continuous autofocus mechanism can determine whether a current focus score is within the acceptable band of focus scores. A refocus scan may be performed if the current focus score is outside of the acceptable band of focus scores.

20 Claims, 8 Drawing Sheets

Related U.S. Application Data continuation of application No. 12/479,728, filed on Jun. 5, 2009, now Pat. No. 8,786,761.

(52) U.S. Cl.
CPC ... *H04N 5/23258* (2013.01); *H04N 5/232123* (2018.08); *H04N 5/772* (2013.01); *H04M 2250/12* (2013.01); *H04M 2250/52* (2013.01)

(58) Field of Classification Search
CPC ....... H04N 5/232123; H04N 5/232125; H04N 5/232127; H04N 5/243; H04N 5/2352; H04N 5/3656; H04N 5/23248; H04N 5/23258
See application file for complete search history.

(56) References Cited

U.S. PATENT DOCUMENTS

| | | | |
|---|---|---|---|
| 6,778,210 B1 | 8/2004 | Sugahara et al. | |
| 7,307,653 B2 | 12/2007 | Dutta | |
| 2001/0028798 A1 | 10/2001 | Manowitz et al. | |
| 2002/0127012 A1 | 9/2002 | Okawara | |
| 2004/0130628 A1 | 7/2004 | Stavely | |
| 2005/0205671 A1 | 9/2005 | Gelsomini et al. | |
| 2006/0066744 A1 | 3/2006 | Stavely et al. | |
| 2006/0192873 A1 | 8/2006 | Yaffe | |
| 2008/0025715 A1 | 1/2008 | Ishii | |
| 2008/0136923 A1 | 6/2008 | Inbar et al. | |
| 2008/0143865 A1* | 6/2008 | Kimoto | G02B 7/36 348/345 |
| 2008/0170124 A1 | 7/2008 | Hatanaka et al. | |
| 2008/0180536 A1* | 7/2008 | Nakahara | H04N 5/232 348/208.99 |
| 2009/0009653 A1 | 1/2009 | Tsai | |
| 2009/0091633 A1 | 4/2009 | Tamaru | |
| 2009/0128640 A1 | 5/2009 | Yumiki | |
| 2009/0179994 A1 | 7/2009 | Miyazaki | |
| 2010/0157086 A1 | 6/2010 | Segale et al. | |
| 2010/0157135 A1* | 6/2010 | Dossaji | G02B 7/36 348/348 |
| 2010/0277603 A1 | 11/2010 | Tsai | |

OTHER PUBLICATIONS

"Autofocus," Wikipedia, http://en.wikipedia.org/wiki/Autofocus, Apr. 15, 2009, (4 pages).

"Depth of field", Wikipedia, http://en.wikipedia.org/wiki/Depth_of_field, Apr. 5, 2009, (24 pages).

"Focus (optics)", Wikipedia, http://en.wikipedia.org/wiki/Focus_(optics), Mar. 19, 2009, (2 pages).

"Glogger Mobile: Camera Auto-Focus & Anti-Blur using Accelerometer Motion for Nokia S60," Tech[dot]Blog, http://thinkabdul.com/2008/08/12/glogger-mobile-camera-auto-focus-anti . . . Aug. 12, 2008, (3 pages).

"GloggerVS2—Camera Shake Detection for N95," Voice of Teenagers, http://voiceofteenagers.blogspot.com/2008/01/gloggervs2-camera-shake. . . Jan. 7, 2008, 3 pages.

"Hyperfocal distance," Wikipedia, http://en.wikipedia.org/wiki/Hyperfocal_distance, Nov. 18, 2008, (7 pages).

"Infinite impulse response", Wikipedia, http://en.wikipedia.org/wiki/Infinite_impulse_responses, Apr. 16, 2009, (4 pages).

"Lens speed", Wikipedia, http://en.wikipedia.org/wiki/Lens_speed, Feb. 14, 2009, (3 pages).

Sachs, David, et al., "Image Stabilization Technology Overview," InvenSense, Inc., Santa Clara, CA 2006, (18 pages).

\* cited by examiner

CONTINUOUS AUTOFOCUS MECHANISMS FOR IMAGE CAPTURING DEVICES

This application is a continuation of co-pending U.S. patent application Ser. No. 14/313,621 filed on Jun. 24, 2014, which is a continuation of U.S. patent application Ser. No. 12/479,728 filed on Jun. 5, 2009, now issued as U.S. Pat. No. 8,786,761.

TECHNOLOGY FIELD

At least some embodiments of the present invention relate to performing continuous autofocus mechanisms for image capturing devices.

BACKGROUND

Automatic focus (hereinafter "autofocus" or "AF") is a feature of some optical systems that allows them to obtain and in some systems to also continuously maintain correct focus on a subject, instead of requiring the operator to adjust focus manually. An autofocus scan often uses a computer to run a miniature motor that moves a lens to various positions to focus the lens for you. Focusing is the moving of the lens in and out until the sharpest possible image of the subject is projected onto the film or other image sensor. Depending on the distance of the subject from the camera, the lens has to be a certain distance from the film to form a clear image.

Autofocus systems rely on one or more sensors to determine correct focus. Some AF systems rely on a single sensor, while others use an array of sensors. Most modern SLR cameras use through-the-lens optical AF sensors, which also perform as light meters. Active AF systems measure distance to the subject independently of the optical system, and subsequently adjust the optical system for correct focus. These systems use what may be characterized as a range detection system to measure distance to the subject. Passive AF systems determine correct focus by performing passive analysis of the image that is entering the optical system. These systems (e.g., contrast detection) generally do not direct any energy, such as ultrasonic sound or infrared light waves, toward the subject.

Contrast measurement is achieved by measuring contrast within a sensor field, through the lens. The intensity difference between adjacent pixels of the sensor naturally increases with correct image focus. The optical system can thereby be adjusted until the maximum contrast is detected. In this method, AF does not involve actual distance measurement at all and is generally slower than phase detection systems, especially when operating under dim light.

SUMMARY

Methods to continuously autofocus a lens of various image capturing devices are described herein. A continuous autofocus mechanism is used to detect when a subject is out of focus and then estimate new focus parameters to refocus the lens with respect to the subject. In one aspect of the present invention, the continuous autofocus mechanism can perform an autofocus scan that positions a lens of the image capturing device in various positions. The autofocus mechanism can obtain focus scores with each focus score being associated with a respective lens position of the autofocus scan. In an embodiment, a focus score is a scene-dependent measure of contrast. The autofocus mechanism can determine an acceptable band of focus scores based on the obtained focus scores. Next, the autofocus mechanism can determine whether a current focus score is within the acceptable band of focus scores. An additional scan (e.g., refocus scan) may be performed if the current focus score is outside of the acceptable band of focus scores. Parameters relating to the focus scores can be used to select an initial starting lens position to begin a refocus scan.

In another embodiment, one or more motion sensors can be used to determine whether the image capturing device is stable enough to perform autofocusing; if it is not, the autofocusing operation can be deferred and the lens can be positioned at the hyperfocal position (e.g., position at which lens is focused at infinity). Also, the data from the one or more motion sensors can be used to filter or possibly ignore focus scores which are obtained when the image capturing device is not stable enough (e.g., the camera is shaking).

The present invention includes methods and devices that perform these methods, including data processing systems which perform these methods, and machine readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least certain embodiments described herein provide a method for a continuous autofocus mechanism for an image capturing device. The autofocus mechanism, in one embodiment, can perform an autofocus scan for a lens of the image capturing device and obtain focus scores associated with the autofocus scan. The autofocus scan moves the lens into various positions with a focus score being obtained for each position. A focus score may be a scene-dependent measure of contrast. The autofocus mechanism, in one embodiment, can determine an acceptable band of focus scores based on the focus scores. Next, the autofocus mechanism can determine whether a current focus score is within the acceptable band of focus scores. A refocus scan is needed if the current focus score is outside of the acceptable band of focus scores. The continuous autofocus mechanism, in one embodiment, occurs to ensure proper focus between the image capturing device and a subject without having access to distance information, available from range detection systems, between the device and the subject.

Figure 1:
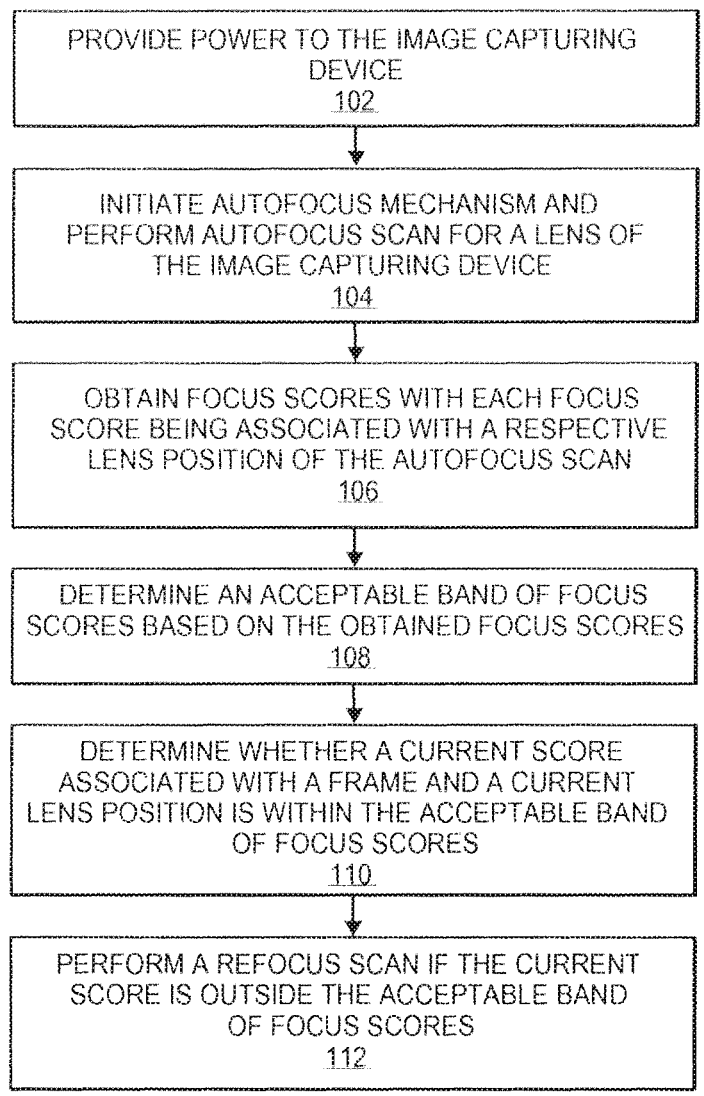
FIG. 1 illustrates a flow diagram of a continuous autofocus mechanism for an image capturing device in accordance with embodiments of the present invention.

FIG. 1 illustrates a flow diagram of a continuous autofocus mechanism for an image capturing device in accordance with embodiments of the present invention. In one embodiment, the continuous autofocus mechanism uses contrast-detect focusing, which does not measure the distance to a subject, instead using the local contrast in a portion of a captured image to estimate if the image is in focus. The continuous autofocus mechanism in such a device needs to detect when the subject is not in focus without having access to distance information and also estimate an optimal lens position for a refocus attempt.

A user of the device (e.g., the device in FIG. 7 or FIG. 8 or FIG. 9) provides power to the image capturing device and places it in an image capture mode (e.g., digital camera mode) at block 102. The device may be capable of performing several functions (e.g., cellular telephone functions, web browsing, email functions, document creation, game or entertainment functions, etc.) in addition to being placed in an image capture mode. A continuous autofocus mechanism initiates at block 104 when the device is placed in the image capture mode. The autofocus mechanism can perform an autofocus scan for a lens of the image capturing device at block 104. The autofocus scan moves the lens into various positions with a focus score being obtained for each position. The autofocus mechanism can obtain focus scores with each focus score being associated with a respective lens position of the autofocus scan at block 106. In one embodiment, one focus score is associated with each lens position (e.g., 0-255) where the lens positions typically can range from a short focus distance (e.g., 6 inches) to a large focus distance (e.g., several miles) between the device and the subject. The autofocus mechanism can determine an acceptable band of focus scores based on the focus scores at block 108. The autofocus mechanism can determine whether a current focus score associated with a current frame and a current lens position is within the acceptable band of focus scores at block 110. The autofocus mechanism can perform an additional autofocus scan, which is a refocus scan, if the current score is outside the acceptable band of focus scores at block 112.

The initial lens position for the refocus scan is based, in one embodiment, on a focus graph formed from the focus scores versus lens positions. If the current score is above an upper limit of the band of focus scores, then a first lens position is set as the initial lens position for purposes of a refocus scan. If the current score is below a lower limit of the band of focus scores, then a second lens position is set as the initial lens position for purposes of a refocus scan. More details regarding the continuous autofocus mechanism with autofocus and refocus scans are described in conjunction with the description of the detailed flow diagram of FIG. 2.

Figure 2:
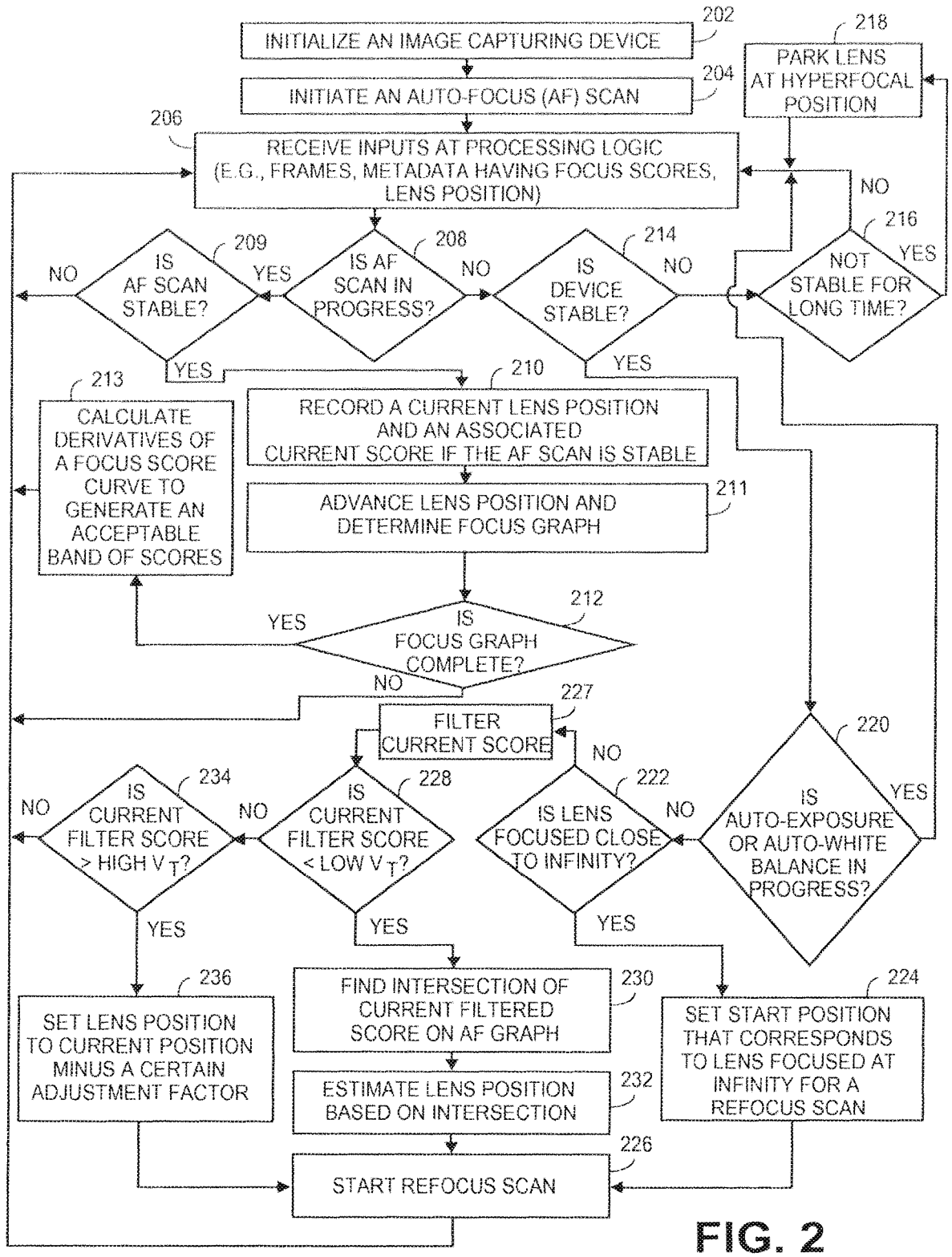
FIG. 2 illustrates a detailed flow diagram of a continuous autofocus mechanism for an image capturing device in accordance with embodiments of the present invention.

FIG. 2 illustrates a detailed flow diagram of a continuous autofocus mechanism for an image capturing device in accordance with embodiments of the present invention. The image capturing device is initialized at block 202. Initialization includes powering the image capturing device, selecting an image capture mode (e.g., capturing still images, capturing video), and initializing the autofocus mechanism. The autofocus mechanism can perform an autofocus (AF) scan that positions a lens of the image capturing device in various predetermined positions at block 204. In one embodiment, processing logic executes the autofocus mechanism in order to control the movement of the lens during the autofocus scan and to generate commands such as scan lens position and move lens position. The processing logic sends and receives information to/from an image sensing unit having a microprocessor and image sensors. The processing logic may include hardware (circuitry, dedicated logic, etc.), software (such as is run on a general purpose computer system or a dedicated machine or a device), or a combination of both. The processing logic (e.g., autofocus processing circuitry) can receive inputs at block 206. The image sensing unit may send frames of metadata (e.g., focal-number, exposure time, white balance, focus score) to the processing logic at block 206. Focus scores are obtained from the metadata. Focus scores can be a scene-dependent measure of image contrast and can indicate the intensity and sharpness of a captured image. Frames are sent at a certain time interval (e.g., 1/15 of a second) to the processing logic. The autofocus mechanism can determine whether the autofocus scan is in progress at block 208. If the autofocus scan is in progress, then the autofocus mechanism can determine whether the autofocus scan is stable at block 209. In particular, the autofocus mechanism may receive an input from the imaging sensing unit that indicates whether focus scores associated with respective lens positions and frames are stable at block 209. Some frames are taken while the lens is still moving, thus these frames include motion blur from the lens movement rather than from the camera. Focus scores associated with these frames are typically not stable. The autofocus mechanism records a current lens position and a current focus score associated with a current frame if the AF scan is in progress and the current frame is stable at block 210. If the AF scan is not stable, then the method returns to block 206. The autofocus mechanism can advance the lens position to other lens positions at block 211 in order to determine a focus graph of focus scores versus lens positions for the current frame. An exemplary focus graph displaying focus scores will be discussed below in conjunction with FIG. 3.

The autofocus mechanism can determine whether the focus graph is complete at block 212. If the graph is complete, the autofocus mechanism, in one embodiment, can calculate derivatives of a focus score curve from the focus graph to generate an acceptable band of scores at block 213. If the graph is not complete, then the autofocus mechanism returns to block 206.

In one embodiment, the autofocus mechanism can calculate derivatives of a peak focus score from the focus graph with respect to adjacent focus scores to determine a steepness of the curve near the peak or maximum focus score. A derivative of a peak focus score may be used to determine an acceptable band or range of focus scores. The autofocus mechanism returns to block 206 to wait for further inputs such as new frames having new focus scores.

In low contrast scenes, the focus curve may be relatively flat resulting in a small derivative. In this case, for derivatives less than a certain value (e.g., 0.03%) a predefined window range (e.g., 3.7%) can be used instead. For example, in an embodiment, based on a derivative's magnitude, an acceptable window (−range, +⅞*range) is computed:

range=absolute magnitude of the derivative*window

If that range is less than a predetermined amount (e.g., 3.125%) of a found peak, it is set to that value.

Returning to block 208, if the autofocus scan is not in progress, then the autofocus mechanism can determine if the device is stable at block 214. In one embodiment, an accelerometer can generate acceleration information that is sent to the processing logic. The acceleration information can include three axes (e.g., x, y, z) of acceleration data for the image capturing device. Using the acceleration data, the processing logic can determine whether the device is moving for a first period of time that compares in a predetermined manner with a threshold value. For example, the processing logic can determine whether the device is stable for the first time period (e.g., 1 or 2 frames) at block 214. If the device is not stable for the first time period, then the autofocus mechanism can determine whether the device is stable for a second time period (e.g., 5 frames, 10 frames) at block 216. If the device is moving for a period of time that compares in a predetermined manner with a threshold value, then the lens may be parked at a hyperfocal position (e.g., infinity) because it is assumed that the device is not stable and in motion (e.g., traveling in an automobile, moving with a jogger). The hyperfocal lens position corresponds to the hyperfocal distance which is the closest distance at which a lens can be focused while keeping objects at infinity acceptably sharp. This is the focus distance with maximum depth of field. If the device is stable for the second time period, then the autofocus mechanism returns to block 206. The acceleration data can be used to stop and start autofocusing and to decide whether to park the lens position at the hyperfocal position.

In alternative embodiments, the accelerometer is replaced with a motion sensor (e.g., a gyroscrope, a motion detector, a tilt sensor such as mercury switch, a compass, or any combination thereof) that generates motion information that can be used to stop and start autofocusing and to decide whether to park the lens position at the hyperfocal position.

Returning to block 214, if the device is stable for the first time period, then the autofocus mechanism determines whether auto-exposure or auto-white balance processes are in progress at block 220. If either of these processes is in progress, then the autofocus mechanism returns to block 206. If neither process is in progress, then the autofocus mechanism can determine whether the lens position is out of focus and needs to be adjusted using another autofocus scan, which is a refocus scan. Blocks 222-236 are used to determine if the refocus scan is needed and implement one if appropriate.

The autofocus mechanism can determine whether the lens is focused close to infinity at block 222. If so, then the autofocus mechanism sets a start position that corresponds to a lens focused at infinity for a refocus scan at block 224. The autofocus mechanism then starts the refocus scan at block 226 with this setting.

If the lens is not focused close to infinity, then the autofocus mechanism can filter or possibly ignore a current focus score using an infinite impulse response filter at block 227. The parameters of the filter are controlled by motion data (e.g., acceleration data) associated with frames that provide the focus scores. Motion data (e.g., acceleration data) is provided by the motion sensor (e.g., accelerometer) and indicates whether the frame is stable. A less stable frame will have a dampened filtered current score as described in more detail in conjunction with FIG. 5.

Next, the autofocus mechanism can determine if a current filtered score is less than a low threshold that defines a lower limit of the acceptable band of scores at block 228. In one embodiment, the low threshold is approximately equal to the peak current score minus a window times the derivative of the peak current score with respect to an adjacent focus score. The window is computed based on the lens position associated with the peak focus score. In one embodiment, the window is the difference between a high threshold value and a low threshold value for a given lens position. If the filtered current score is less than the low threshold, then the autofocus mechanism can determine an intersection of the filtered current score on the focus graph at block 230. Next, the autofocus mechanism can estimate a new lens position based on this intersection at block 232. Then, the autofocus mechanism can start a refocus scan at block 226 with this new lens position setting.

Returning to block 228, if the filtered current score is not less than the low threshold, then the autofocus mechanism can determine if the filtered current score is greater than a high threshold that defines an upper limit of the acceptable band of scores at block 234. In one embodiment, the high threshold is approximately equal to the peak current score plus a window times the derivative of the peak current score with respect to an adjacent focus score times a predetermined value (e.g., 1.75). If the filtered current score is greater than the high threshold, then the autofocus mechanism sets the lens position to a new position in which the lens moves from the current position by a predetermined adjustment towards a lens position associated with the lens being focused near infinity at block 236. Then, the autofocus mechanism starts a refocus scan at block 226 with this new lens position setting.

Figure 3:
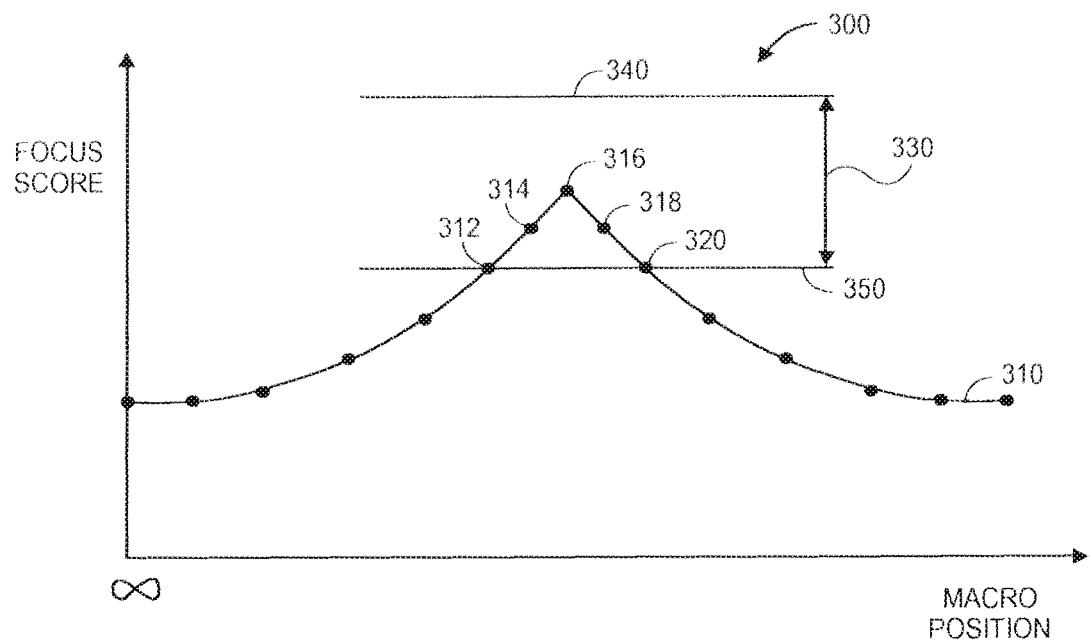
FIG. 3 illustrates an exemplary focus graph in accordance with one embodiment of the present invention.

FIG. 3 illustrates an exemplary focus graph in accordance with one embodiment of the present invention. The focus graph 300 may be determined at block 211 of FIG. 2. The focus graph 300 illustrates focus scores (e.g., 312-320) versus lens positions. Derivatives of the peak focus score 316 with respect to adjacent focus scores 312, 314, 318, and 310 are calculated. In one embodiment, a largest derivative indicating a steepest portion near the peak score 310 can be used to determine an acceptable band or range 330 of focus scores. An upper limit 340 (e.g., high threshold) and a lower limit 350 (e.g., low threshold) define the boundaries of the band 330. The low threshold may equal the peak current score (e.g., 316) minus a window (e.g., band 330) times the largest derivative of the peak current score with respect to an adjacent focus score. The high threshold may equal the peak current score plus a window (e.g., band 330) times the largest derivative of the peak current score with respect to an adjacent focus score times a predetermined value (e.g., 1.75). A refocus scan can be initiated if the current filtered focus score is not within the band 330 as discussed above in conjunction with the description of blocks 222-236.

Figure 4:
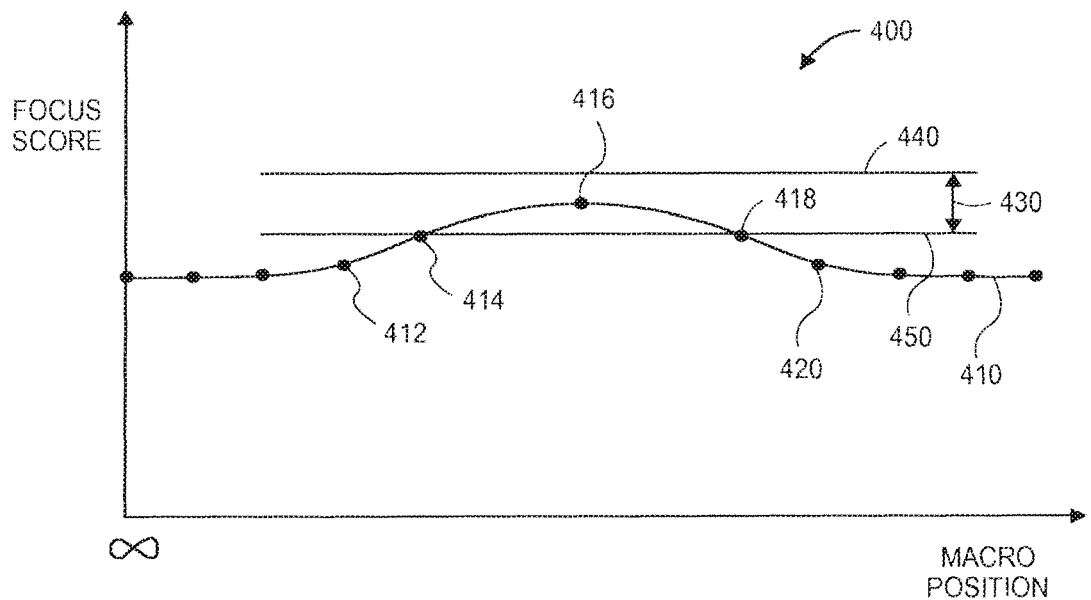
FIG. 4 illustrates an exemplary focus graph in accordance with one embodiment of the present invention.

FIG. 4 illustrates an exemplary focus graph in accordance with another embodiment of the present invention. The focus graph 400 may be determined at block 211 of FIG. 2.

The focus graph 400 illustrates focus scores (e.g., 412-420) versus lens positions. Derivatives of the peak focus score 416 with respect to adjacent focus scores 412, 414, 418, and 410 are calculated. In one embodiment, a largest derivative indicating a steepest portion near the peak score 410 is used to determine an acceptable band or range 430 of focus scores. An upper limit 440 (e.g., high threshold) and a lower limit 450 (e.g., low threshold) define the boundaries of the band 430. A refocus scan can be initiated if the current filtered focus score is not within the band 430 as discussed above in conjunction with the description of blocks 222-236. The curve 410 has a more narrow band 430 compared to the band 330. The curve 410 may arise in low contrast scenes.

Figure 5:
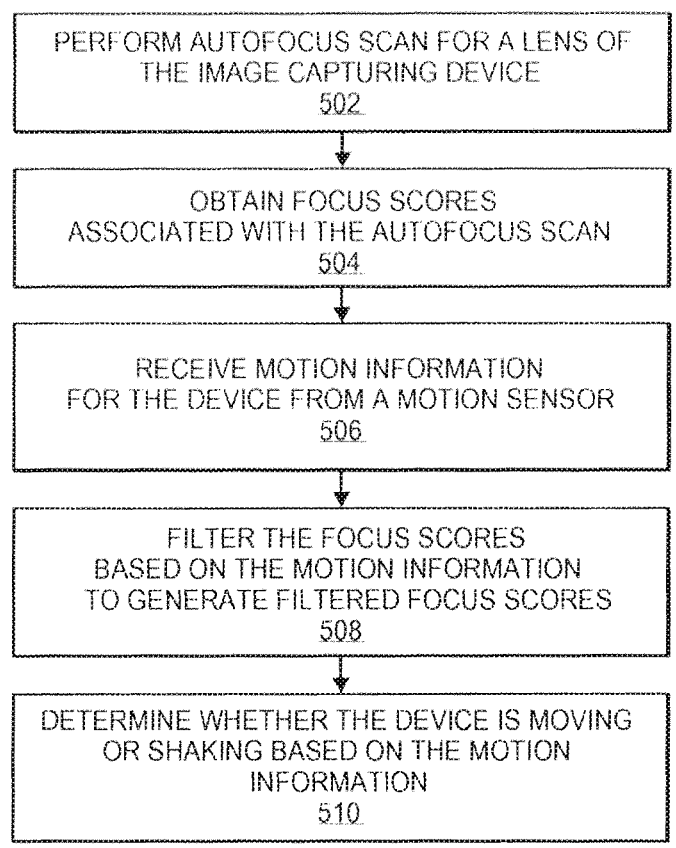
FIG. 5 illustrates a flow diagram of a continuous autofocus mechanism with filtering for an image capturing device in accordance with embodiments of the present invention.

FIG. 5 illustrates a flow diagram of a continuous autofocus mechanism with filtering for an image capturing device in accordance with certain embodiments of the present invention. Upon initialization, the autofocus mechanism performs an autofocus scan for a lens of the image capturing device at block 502. The autofocus mechanism obtains focus scores with each focus score being associated with a respective lens position of the autofocus scan at block 504. The autofocus mechanism receives motion information for the device from one or motion sensors (e.g., an accelerometer, a gyroscope, a motion detector, a tilt sensor such as mercury switch, a compass, or any combination thereof) at block 506. The autofocus mechanism filters the focus scores based on the motion information to generate filtered focus scores at block 508. Motion information for the device is associated with a frame, which has a start time and a duration. Then, a focus score attached to the frame is associated with the motion data.

In one embodiment, filtering occurs using an infinite impulse response (IIR) filter to reduce noise in the signal that sends frames to processing logic. The IIR filter is used to filter over the focus scores from previous frames. A filter parameter is controlled by the motion sensor(s) in that the focus score from the frame contributes less to the filtered score if the motion sensor(s) registered some shake during that frame because shake makes the focus score less reliable. The autofocus mechanism can determine whether the device is moving or shaking based on the motion information at block 510.

Figure 6:
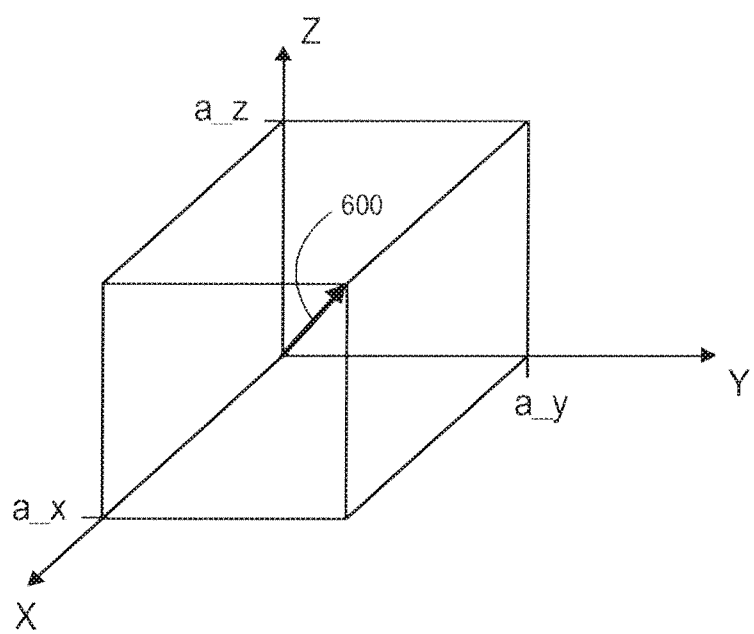
FIG. 6 illustrates a three-component vector 600, (a_x, a_y, a_z), generated by a motion sensor (e.g., accelerometer) that represents the motion (e.g., acceleration) in three orthogonal axes, in accordance with one embodiment of the present invention.

In some embodiments, each focus score can be filtered by dampening or applying a weighted factor based on the associated motion information (e.g., acceleration information). The motion sensor(s) can generate a three-component vector 600, (a_x, a_y, a_z), as illustrated in FIG. 6, in accordance with one embodiment, that represents the motion (e.g., acceleration) in three orthogonal axes. The autofocus mechanism can compute the squared length of the difference between this vector and a motion (e.g., acceleration) vector from a previous frame (pa_x, pa_y, pa_z):

$$\text{motion delta} = (a\_x - pa\_x)^2 + (a\_y - pa\_y)^2 + (a\_z - pa\_z)^2$$

In an embodiment, the motion delta is an accelerometer delta. The filtered focus score is updated from the previous filtered focus score and the current focus score attached to the frame, if the acceleration change is not larger than some threshold. The threshold and dampening may be calculated as follows with 's' representing a dampening factor and 'f' representing a focus value. For a threshold set equal to 0.04f, if the accelerometer delta is less than threshold*threshold, then $$s = 0.9f + s*(0.1f/(\text{threshold}*\text{threshold})) \text{ and}$$

a new filtered focus score = a previous filtered focus score*s + a current focus score*(1.0f−s)

If the accelerometer delta is less than a threshold, which indicates that the device is stable, then 's' varies from 0.9f to 1.0f and the current focus score has a contribution to the new filtered focus score. If the accelerometer delta is equal to or greater than the threshold, which indicates that the device is not stable, then 's' equals 1.0f and the current focus score has no contribution to the new filtered focus score. The 0.9f and 0.1f values determine how fast the filter reacts to changes in the focus scores. In this example, the filter is heavily dampened.

Many of the methods in embodiments of the present invention may be performed with a digital processing system, such as a conventional, general-purpose computer system. Special purpose computers, which are designed or programmed to perform only one function, may also be used.

Figure 7:
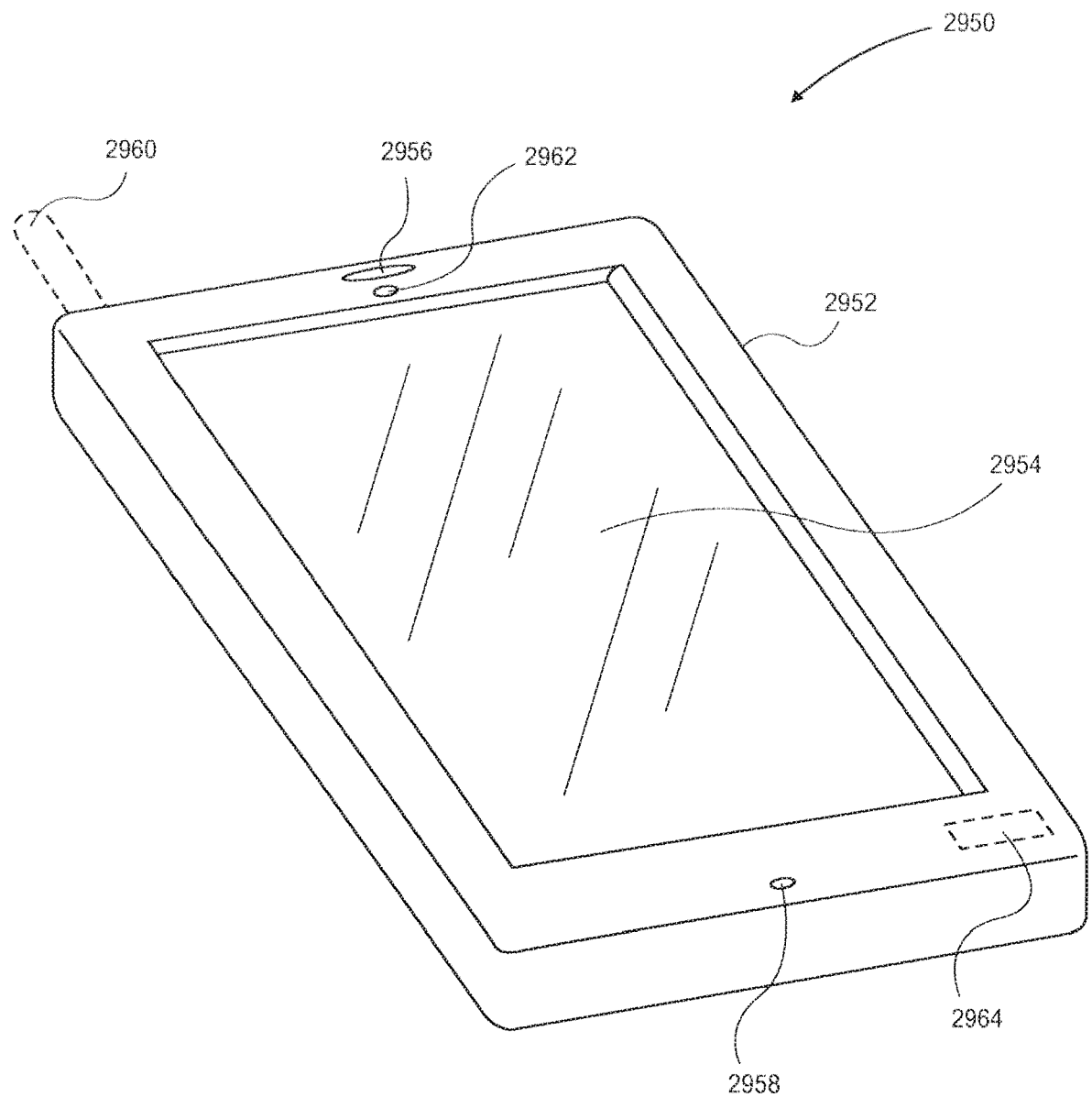
FIG. 7 shows an image capturing device 2950 in accordance with one embodiment of the present invention.
Figure 8:
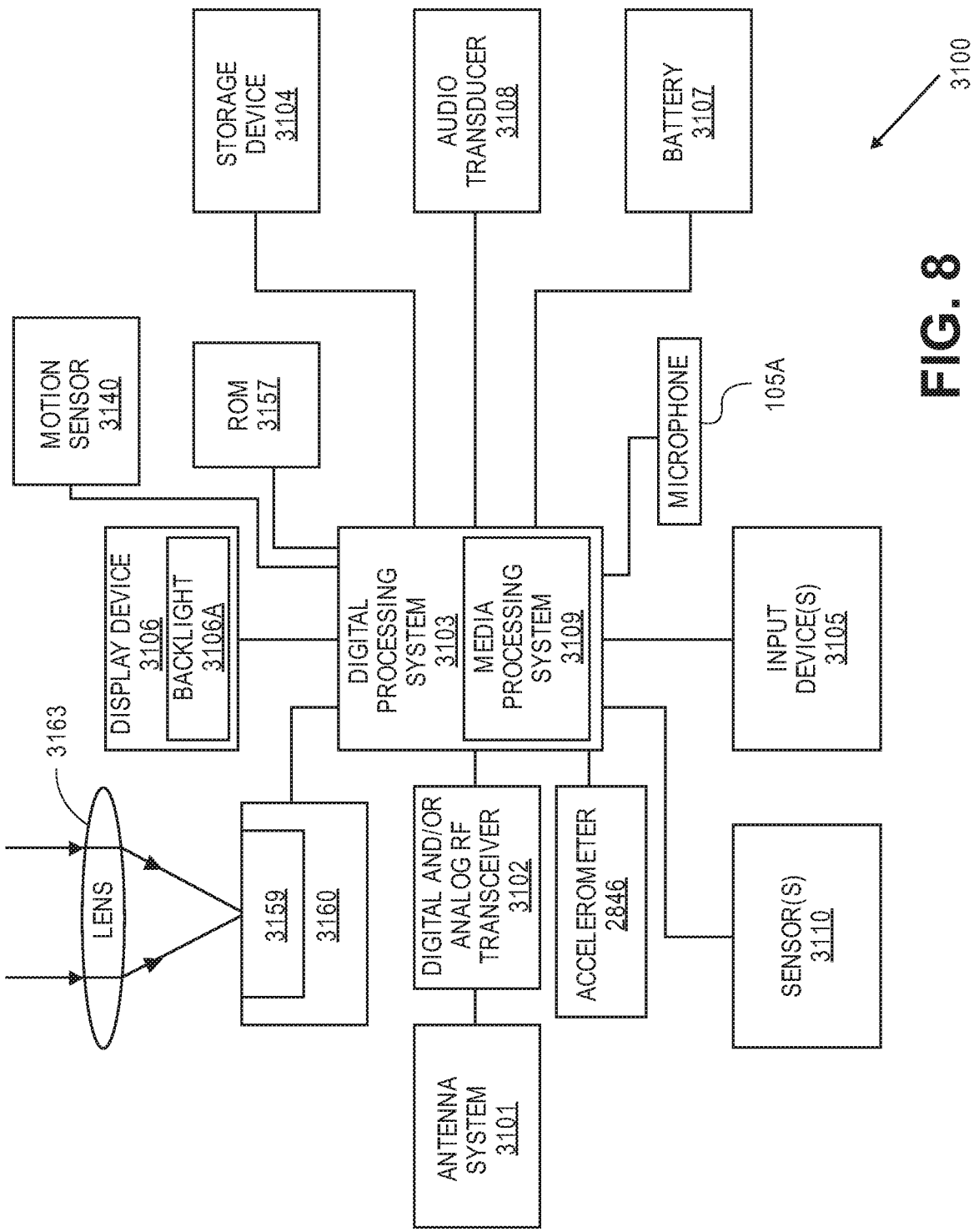
FIG. 8 shows an embodiment of a wireless image capturing device which includes the capability for wireless communication and for capturing images in accordance with one embodiment of the present invention.
Figure 9:
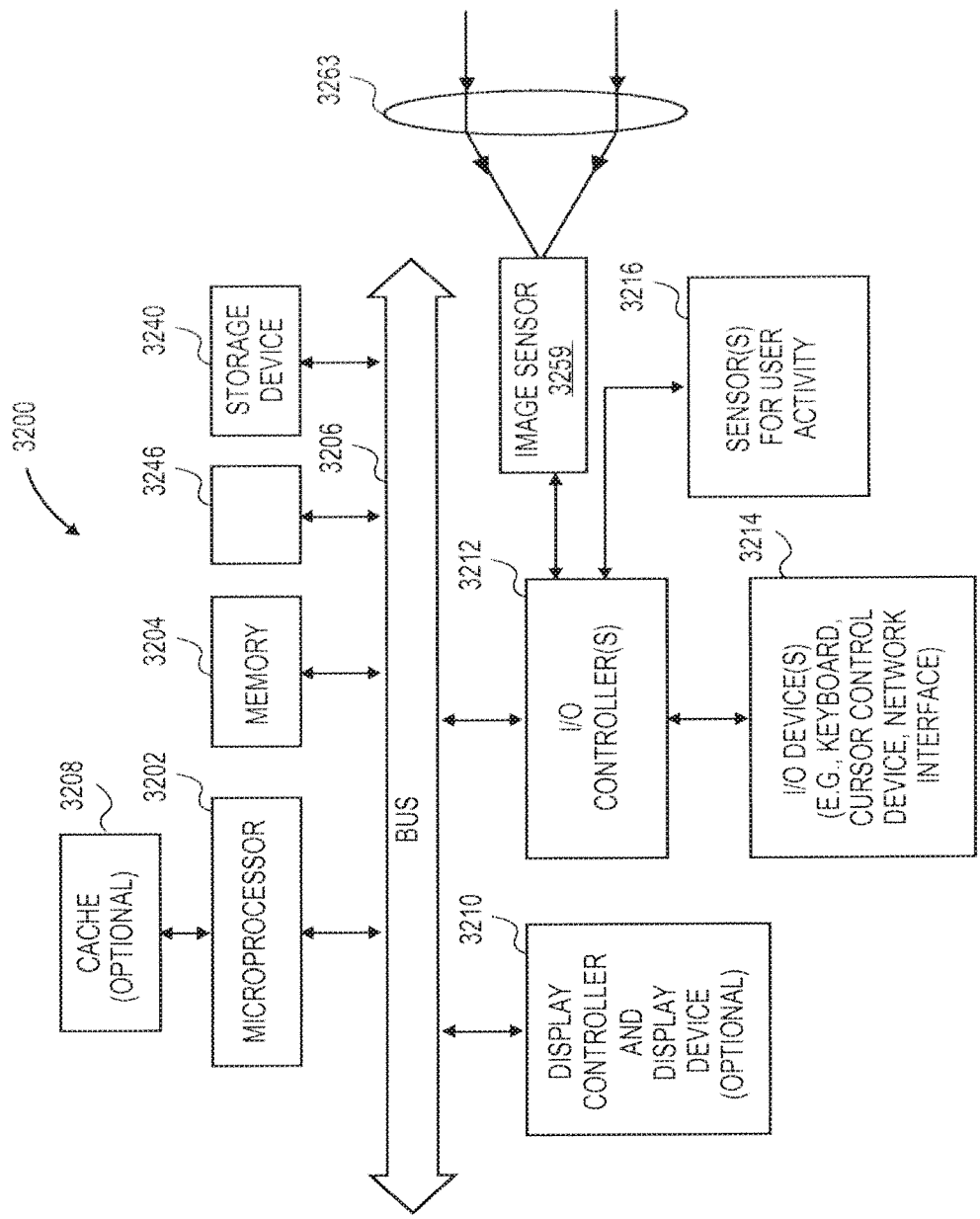
FIG. 9 shows another example of a data processing system according to an embodiment of the present invention.

In some embodiments, the methods, systems, and apparatuses of the present disclosure can be implemented in various devices including electronic devices, consumer devices, embedded devices, data processing systems, desktop computers, portable computers, wireless devices, cellular devices, tablet devices, handheld devices, multi touch devices, multi touch data processing systems, any combination of these devices, or other like devices. FIGS. 7-9 illustrate examples of a few of these devices, which are capable of capturing still images and video to implement the methods of the present disclosure.

FIG. 7 shows an image capturing device 2950 in accordance with one embodiment of the present invention. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and a motion sensor (e.g., accelerometer) 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone, and an iPod are portable devices.

In certain embodiments of the present disclosure, the device 2950 can be used to implement at least some of the methods discussed in the present disclosure.

FIG. 8 shows an embodiment of a wireless image capturing device which includes the capability for wireless communication and for capturing images and video. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing system, such as a microprocessor or controller for example. Digital processing system 3103 may also be a special purpose processing system, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special purpose processing system to manage media, such as files of audio data.

Wireless device 3100 may also include a storage device 3104, coupled to the digital processing system, to store data and/or operating programs for the wireless device 3100. Storage device 3104 may be, for example, any type of solid-state or magnetic memory device. Storage device 3104 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, display device 3106, and an image sensor 3159 (e.g., CCD (Charge Coupled Device), CMOS based device). The image sensor may be integrated with an image processing unit 3160. The display device 3106 may include a Liquid Crystal Display (LCD) which may be used to display images or video which are captured or recorded by the wireless image capturing device 3100. The LCD serves as a viewfinder of a camera and there may optionally be other types of image display devices on device 3100 which can serve as a viewfinder.

The device 3100 also includes an imaging lens 3163 which can be disposed over image sensor 3159. The processing system 3103 controls the operation of the device 3100; and, it may do so by executing a software program stored in ROM 3157, or in the processing system 3103, or in both ROM 3157 and the processing system 3103.

The processing system 3103 controls the image processing operation; and, it controls the storage of a captured image in storage device 3104. The processing system 3103 also controls the exporting of image data (which may or may not be color corrected) to an external general purpose computer or special purpose computer.

The processing system 3103 also responds to user commands (e.g., a command to "take" a picture or video by capturing image(s) on the image sensor and storing it in memory or a command to select an option for contrast enhancement and color balance adjustment).

The ROM 3157 may store software instructions for execution by the processing system 3103 to perform a continuous autofocus mechanism associated with the lens 3163, obtain focus scores, determine an acceptable band of focus scan, and initiate a refocus scan if a current focus score is out of band. The storage device 3104 is used to store captured/recorded images or video which are received from the image sensor 3159. It will be appreciated that other alternative architectures of a camera can be used with the various embodiments of the invention.

Battery 3107 may be, for example, a rechargeable or non-rechargeable lithium or nickel metal hydride battery. Wireless device 3100 may also include audio transducers 3108, which may include one or more speakers, and at least one microphone 3105A, and an accelerometer 2846.

According to one embodiment, the accelerometer 2846 is able to detect an acceleration or deceleration of the wireless device 3100. For example, the accelerometer 2846 may generate X, Y and Z axis acceleration information. In addition, the processing system is coupled to the accelerometer(s) 2846. The processing system may be integrated with the accelerometer 2846 or integrated with other components, such as, for example, a chipset of a microprocessor, of the portable device.

The accelerometer 2846 may continuously or periodically monitor the acceleration of the portable device.

In some embodiments, the image capturing device 3100 includes the storage device 3104 to store captured images, the lens 3163 to receive incident light associated with an image to be captured, and the processing system 3103 coupled to the storage device 3104. The processing system 3103 is configured to perform an autofocus scan to obtain a lens position that is focused on a scene such that a sharp image is formed on the image sensor, to obtain focus scores with each focus score being associated a respective lens position of the autofocus scan, and to determine an acceptable band of focus scores for the lens.

The processing system is further configured to determine whether a frame is stable, to determine a current lens position and a current focus score associated with the frame if the frame is stable, and to determine whether the current focus score associated with the frame is within the acceptable band of focus scores.

In an embodiment, determining the acceptable band of focus scores occurs by differentiating a peak focus score value with respect to focus score values adjacent to the peak focus score value.

In one embodiment, the device 3100 further includes a motion sensor 3140 (e.g., an accelerometer, a gyroscope, a motion detector, a tilt sensor such as mercury switch, a compass, or any combination thereof) to determine motion information for the device. The processing system is configured to determine whether the device is moving based on the motion information. The processing system is configured to determine whether a refocus scan is needed and to start a refocus scan. The processing system is configured to perform the refocus scan by positioning the lens in various predetermined positions.

In one embodiment, the processing system is configured to implement an early-abort heuristic to improve the speed of the refocus operation. The processing system is configured to detect, after a number of lens positions have been tried in a refocus scan, that the lens has moved past a predetermined position in which the lens focuses on a scene such that a high quality image is captured. The processing system is also configured to abort the refocus scan without moving the lens to the remaining positions of the refocus scan. The heuristic significantly reduces an amount of time necessary to do a refocus scan. In one embodiment, the refocus scan can be performed approximately 50% faster than without the heuristic.

In some embodiments, the processing system can detect that focus scores have decreased twice in a row from a first focus score to a second focus score to a third focus score. Then, the processing system determines if the third focus score has decreased by a certain amount (e.g., 12%) or more compared to the first focus score. If so, then the processing system aborts the refocus scan and does not move the lens to the remaining positions in the refocus scan. If either of the above criteria is not met, then the processing system proceeds with the refocus scan.

In certain embodiments of the present disclosure, the wireless device 3100 can be used to implement at least some of the methods discussed in the present disclosure.

FIG. 9 shows an example of a data processing system according to an embodiment of the present invention. This data processing system 3200 may include a processor, such as microprocessor 3202, and a memory 3204, which are coupled to each other through a bus 3206. The data processing system 3200 may optionally include a cache 3208 which is coupled to the microprocessor 3202. The data processing system may optionally include a storage data processing system 3240 which may be, for example, any type of solid-state or magnetic memory data processing system. Storage data processing system 3240 may be or include a machine-readable medium.

This data processing system may also optionally include a display controller and display data processing system 3210 which is coupled to the other components through the bus 3206. One or more input/output controllers 3212 are also coupled to the bus 3206 to provide an interface for input/output data processing systems 3214 and to provide an interface for one or more sensors 3216 which are for sensing user activity. The bus 3206 may include one or more buses connected to each other through various bridges, controllers, and/or adapters as is well known in the art. The input/output data processing systems 3214 may include a keypad or keyboard or a cursor control data processing system such as a touch input panel. Furthermore, the input/output data processing systems 3214 may include a network interface which is either for a wired network or a wireless network (e.g. an RF transceiver). The sensors 3216 may be any one of the sensors described herein including, for example, a proximity sensor or an ambient light sensor. In at least certain implementations of the data processing system 3200, the microprocessor 3202 may receive data from one or more sensors 3216 or from image sensor 3259 or from accelerometer 3246 and may perform the analysis of that data in the manner described herein. Image sensor 3259 captures an image via light focused by lens 3263.

In certain embodiments of the present disclosure, the data processing system 3200 can be used to implement at least some of the methods discussed in the present disclosure.

The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as device 3100 in FIG. 8. The methods of the present invention can also be implemented as computer instructions for execution on a data processing system, such as system 3200 of FIG. 8.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for autofocus in an image capturing device, the method comprising:
    performing an initial scan by computing a plurality of focus scores for a plurality of lens positions, respectively;
    computing an acceptable range of focus, from the plurality of focus scores;
    computing a plurality of current focus scores; and
    if one of the plurality of current focus scores is outside of the acceptable range of focus, then determining a new lens position and signaling that a refocus scan be performed with the new lens position.

2. The method of claim 1 further comprising performing the refocus scan starting with the new lens position, by computing a plurality of new focus scores for a plurality of new lens positions, respectively.

3. The method of claim 2 wherein the new lens position is determined based on the plurality of focus scores, for the plurality of lens positions, of the initial scan.

4. The method of claim 2 further comprising:
    computing a new acceptable range of focus, from the plurality of new focus scores for the plurality of new lens positions;
    computing a plurality of new current focus scores for a plurality of new current lens positions, respectively; and
    if one of the plurality of new current focus scores is outside of the new acceptable range of focus, then a further new lens position is determined and a further refocus scan is signaled.

5. The method of claim 1 wherein performing the initial scan comprises:
    a) recording a present lens position and a present focus score for the present lens position, only if the initial scan is stable; and
    b) changing to another lens position and repeating a).

6. The method of claim 5 further comprising determining if the initial scan is stable by considering data from an accelerometer.

7. The method of claim 6 wherein the data from the accelerometer is used to decide between a) continuing with the refocus scan and filtering or ignoring a focus score and b) stopping autofocus and setting a hyperfocal lens position.

8. The method of claim 1 further comprising filtering the plurality of current focus scores to produce filtered current focus scores, and determining whether one of the filtered current focus scores is outside of the acceptable range of focus.

9. The method of claim 8 wherein filtering the plurality of current focus scores is based on data from an accelerometer.

10. The method of claim 1 further comprising
aborting a refocus scan early, by not signaling a lens to move to a plurality of remaining lens positions of the refocus scan, wherein aborting the refocus scan early comprises detecting that a predetermined number of lens positions have been tried in the refocus scan and the lens has passed by a predetermined lens position.

11. An image capture system having autofocus capability comprising:
a lens; and
a digital processing system configured to perform autofocus control of a position of the lens, the system being configured to
perform an initial scan by computing a plurality of focus scores for a plurality of lens positions, respectively,
compute an acceptable range of focus, from the plurality of focus scores,
compute a plurality of current focus scores, and
if one of the plurality of current focus scores is outside of the acceptable range of focus, then a new lens position is determined and a refocus scan is to be performed with the new lens position.

12. The system of claim 11 wherein the digital processing system is configured to perform the refocus scan starting with the new lens position, by computing a plurality of new focus scores for a plurality of new lens positions, respectively.

13. The system of claim 12 wherein the new lens position is determined based on the plurality of focus scores, for the plurality of lens positions, of the initial scan.

14. The system of claim 12 wherein the digital processing system is further configured to:
compute a new acceptable range of focus, from the plurality of new focus scores for the plurality of new lens positions;
compute a plurality of new current focus scores for a plurality of new current lens positions, respectively; and
if one of the plurality of new current focus scores is outside of the new acceptable range of focus, determine a further new lens position and signal a further refocus scan.

15. The system of claim 11 wherein to perform the initial scan the digital processing system
a) records a present lens position and a present focus score for the present lens position, only if the initial scan is stable, and
b) changes to another lens position and repeats a).

16. The system of claim 15 wherein the digital processing system is configured to determine if the initial scan is stable by considering data from an accelerometer.

17. The system of claim 16 wherein the data from the accelerometer is used to decide between a) continuing with the refocus scan and filtering or ignoring a focus score and b) stopping autofocus and setting a hyperfocal lens position.

18. The system of claim 11 wherein the digital processing system is configured to filter the plurality of current focus scores to produce filtered current focus scores, and determine whether one of the filtered current focus scores is outside of the acceptable range of focus.

19. The system of claim 18 wherein filtering the plurality of current focus scores is based on data from an accelerometer.

20. The system of claim 11 wherein the digital processing system is configured to abort a refocus scan early, by not signaling a lens to move to a plurality of remaining lens positions of the refocus scan, wherein aborting the refocus scan early comprises detecting that a predetermined number of lens positions have been tried in the refocus scan and the lens has passed by a predetermined lens position.

* * * * *